United States Patent [19]

Inoue

[11] Patent Number: 5,392,444
[45] Date of Patent: Feb. 21, 1995

[54] PROGRAMMABLE CONTROLLER FOR COMPLETING THE EXECUTION OF A BLOCK OF USER PROGRAMS WITHIN A SET TIME PERIOD

[75] Inventor: Tadashi Inoue, Kyotu, Japan

[73] Assignee: Omron Tateisi Electronics Co., Kyoto, Japan

[21] Appl. No.: 24,865

[22] Filed: Feb. 26, 1993

Related U.S. Application Data

[63] Continuation of Ser. No. 205,174, Jun. 10, 1988, abandoned.

[30] Foreign Application Priority Data

Jun. 6, 1987 [JP] Japan .................. 62-146279

[51] Int. Cl.$^6$ .................. G06F 1/24; G06F 9/06; G06F 9/40; G06F 13/22
[52] U.S. Cl. .................. 395/800; 364/230.1; 364/230.5; 364/231.4; 364/231.6; 364/241.2; 364/265.6; 364/267.2; 364/267.9; 364/267.4; 364/268.2; 364/269.4; 364/271; 364/271.6; 364/271.9; 364/271.3; 364/DIG. 1; 364/DIG. 2; 395/775; 395/550
[58] Field of Search .............. 395/375, 775, 725, 700, 395/550, 500, 800, 325, 200, 400, 425, 250, 275, 575, 650; 364/DIG. 1, DIG. 2

[56] References Cited

U.S. PATENT DOCUMENTS

| | | | |
|---|---|---|---|
| 4,126,895 | 11/1978 | Weemaes et al. | 364/200 |
| 4,228,495 | 10/1980 | Bernhard et al. | 364/200 |
| 4,262,331 | 4/1981 | Freeland et al. | 364/200 |
| 4,319,338 | 3/1982 | Grudowski et al. | 364/900 |
| 4,326,207 | 4/1982 | Suda et al. | 364/900 |
| 4,486,741 | 12/1984 | Nozawa et al. | 340/825.18 |
| 4,495,562 | 1/1985 | Yamaji et al. | 364/200 |
| 4,517,641 | 5/1985 | Pinheiro | 364/200 |
| 4,623,961 | 11/1986 | Mackiewicz | 364/900 |
| 4,638,452 | 1/1987 | Schultz et al. | 364/900 |
| 4,694,409 | 9/1987 | Lehman | 364/558 |
| 4,722,043 | 1/1988 | Nagamine et al. | 364/147 |
| 4,809,217 | 2/1989 | Floro et al. | 364/900 |
| 4,809,269 | 2/1989 | Gulick | 370/94 |

FOREIGN PATENT DOCUMENTS

WO8601012 7/1985 WIPO .

Primary Examiner—Alyssa H. Bowler
Assistant Examiner—Daniel H. Pan
Attorney, Agent, or Firm—Dickstein, Shapiro & Morin

[57] ABSTRACT

A programable controller includes a cycle time setter, a counter, and a calculator. The cycle time setter sets a cycle time for one round of execution of a sequential series of processing routines. The counter counts an execution time between the start of a first predetermined processing routine of the series and the termination of a second predetermined processing routine of the series subsequent to the first. The time difference between the execution time counted by the counter and the cycle time is calculated and, if positive, is allocated to execution of the remainder of the processing routines in the series.

14 Claims, 9 Drawing Sheets

PROGRAMMABLE CONTROLLER FOR COMPLETING THE EXECUTION OF A BLOCK OF USER PROGRAMS WITHIN A SET TIME PERIOD

This application is a continuation of application Ser. No. 07/205,174, filed Jun. 10, 1988, now abandoned.

BACKGROUND OF THE INVENTION

1. Field of the Invention

This invention relates to a programable controller, and more particularly, to a programable controller which allows a flexible setting of a cycle time for one round of execution of a series of processing routines.

2. Discussion of the Related Art

In a conventional programable controller (PC), for example, a scanning-type PC, a series of processing routines including at least an input/output (I/O) refreshing routine and user programs are repeatedly executed by a microprocessor to perform various control functions. The series of processing routines can include, for example, a common routine, a PC linking routine, a host linking routine and a tool routine besides the I/O refreshing routine and the user programs.

As is well known, the execution time of the user programs fluctuates depending on the total program size and the states of the I/O ports during the execution of the programs. Accordingly, the total execution time, or cycle time, required for one round of execution of the series of processing routines also fluctuates. This fluctuation of the cycle time also results in a fluctuation in the starting time of the execution of the I/O refreshing routine. Consequently, machines to be controlled by I/O data supplied by the PCs during the I/O refreshing routine cannot be precisely controlled. To obtain a stable starting time of the I/O refreshing routine, the clock frequency of the PCs can be increased or decreased to obtain a constant cycle time. However, this approach raises another problem in that the execution speed of the user programs changes which can affect the various functions controlled by the controllers.

SUMMARY OF THE INVENTION

It is, therefore, an object of this invention to provide a programable controller which permits a flexible setting of the cycle time without changing the clock frequency of the PC.

According to this invention, there is provided a programable controller which includes (1) a setting mechanism for setting a cycle time for one round of execution of a series of processing routines, (2) a counting mechanism for counting an execution time from the start of a first predetermined processing routine of the series to the termination of a second, subsequent predetermined processing routine of the series, (3) a calculating mechanism for calculating a time difference between the execution time counted by the counting means and the cycle time, and (4) an allocating mechanism for allocating the time difference to execution of the remainder of the processing routines in the series.

BRIEF DESCRIPTION OF THE DRAWINGS

The above and other objects, advantages and features of this invention will be more fully understood from the following detailed description provided in conjunction with the following figures, of which.

DETAILED DESCRIPTION OF THE INVENTION

Figure 1:
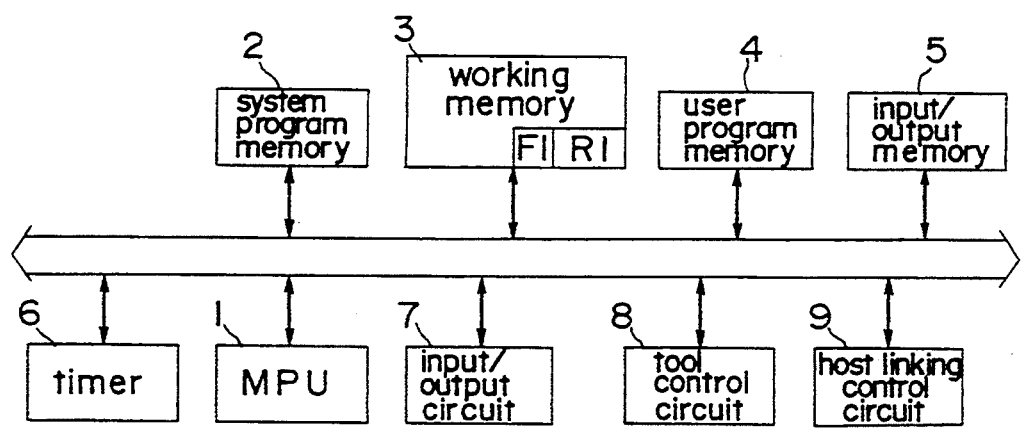
FIG. 1 is a circuit diagram of a preferred embodiment of this invention.

FIG. 1 is a circuit diagram of a programable controller according to a preferred embodiment of this invention. As shown in FIG. 1, the PC includes a microprocessor unit (MPU) 1, a system program memory 2, a working memory 3, a user program memory 4, an I/O (input/output) memory 5, a timer 6, an I/O circuit 7 including I/O relays, a tool control circuit 8 for interfacing the PC with an associated tool and allowing communication between the PC and tool and a host linking control circuit 9 which controls communication between the PC and an associated host computer. MPU 1 reads control programs from system program memory 2 and executes them communicating with working memory 3, so that the control functions of the PC can be performed.

As is shown in the FIG. 3 execution cycle time diagram, the processing routines for accomplishing the control functions of the PC include, for example, a common processing routine which is predetermined as a first processing routine by a control program described in greater detail below in connection with FIG. 2, an I/O refreshing processing routine, a user program routine which is predetermined as a second processing routine by the FIG. 2 program, a PC linking processing routine, a host linking processing routine and a tool processing routine.

The common processing routine performs the tasks of resetting a watchdog timer, checking for damaged memory, and checking the integrity of an I/O bus (i.e. for shorts or open circuit conditions). The I/O refreshing processing routine includes two different processing routines, one for refreshing input IN data and one for refreshing output OUT data. In the IN data refreshing routine, input data retrieved from I/O circuit 7 are stored in input areas of I/O memory 5. In the OUT data refreshing routine, the contents stored in output areas of I/O memory 5 are outputted via I/O circuit 7.

During execution of the user program, MPU 1 sequentially fetches the instructions from user program memory 4 referring to the address set in a program counter and executes the instructions using I/O data stored in I/O memory 5. The results obtained by the program execution are stored into the output areas of I/O memory 5. Moreover, well-known counter and timer processings are carried out.

In the PC linking processing routine, at least two PCs communicate with each other to transmit and receive data stored in link relays of their I/O memories 5. The last linking processing routine permits communication between the PC and a host computer for receiving and transmitting data therebetween. In the tool processing routine, the PC communicates with programing tools over tool control circuit 8 to perform monitoring of the I/O relays or program updating.

The operation of the PC is described below referring to the flow chart shown in FIG. 2 which represents the control program routine for executing the above described processing routines.

Figure 2A:
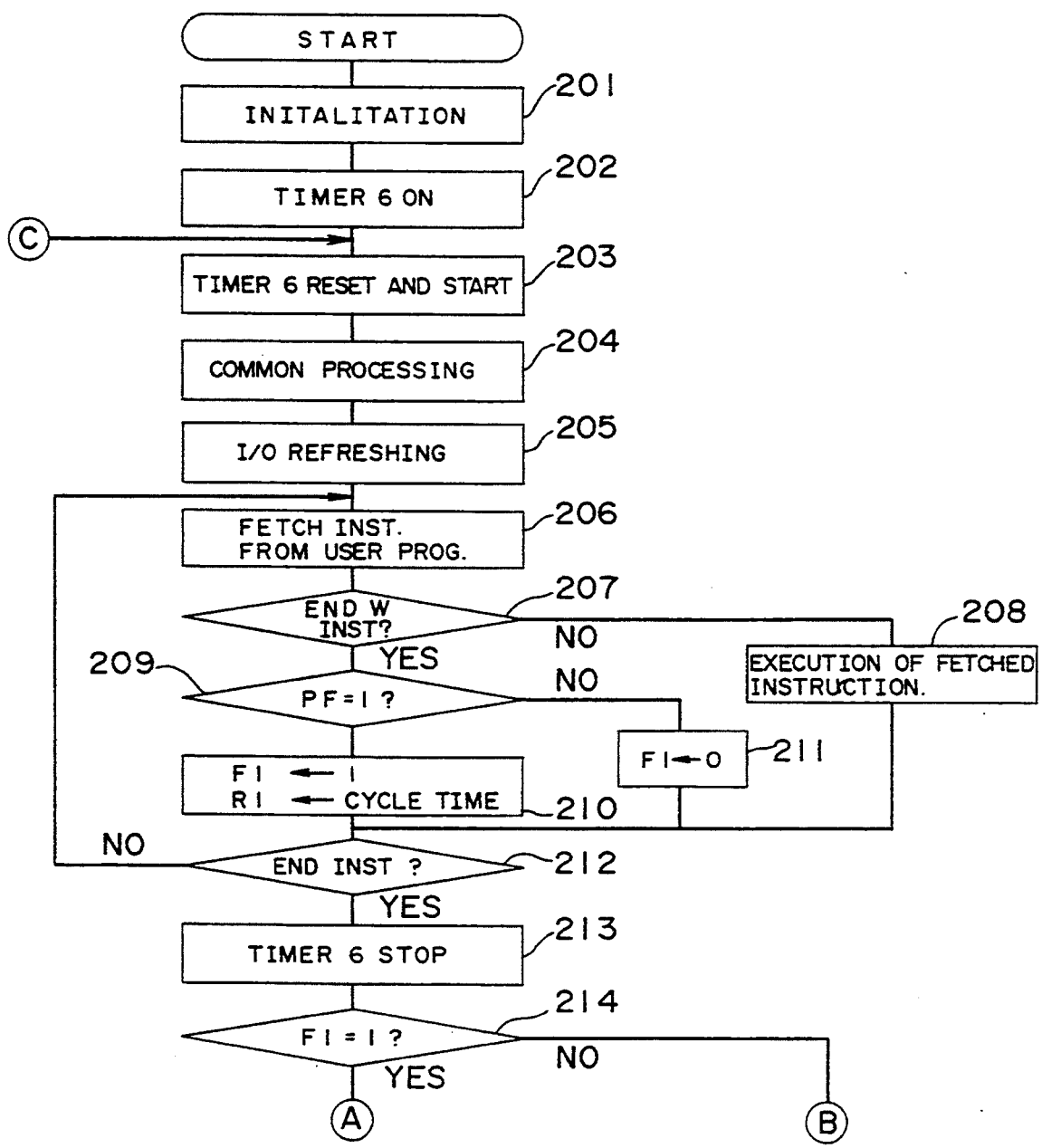
FIGS. 2(A), 2(B) together form a flow chart representing the operation of the FIG. 1 circuit.
Figure 2B:
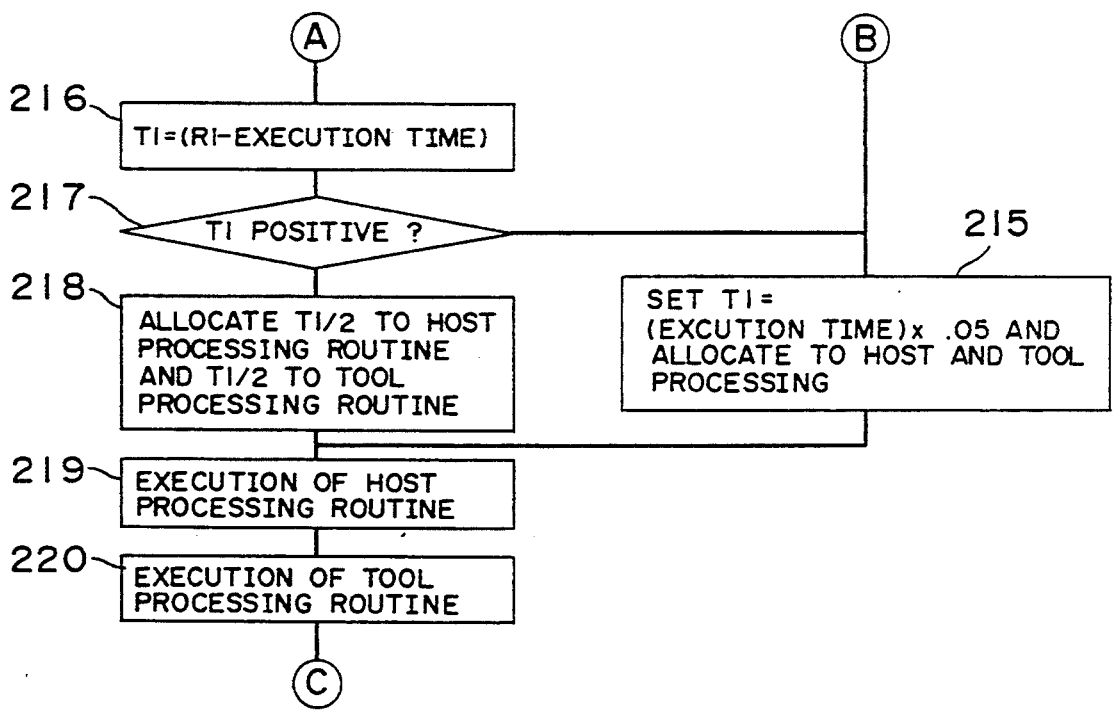
Figure 3:
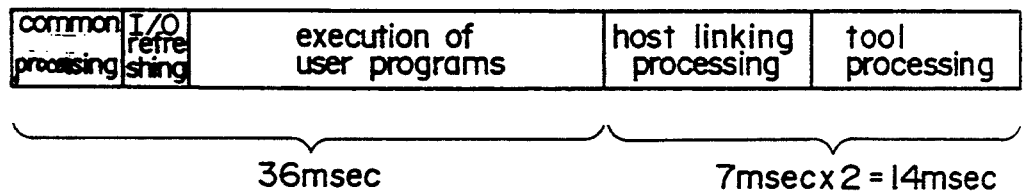
FIG. 3 is a configuration of a cycle time for a series of processing routines.

When the FIG. 2 program is initiated by turning on a power supply, an initialization is carried out in step 201 to clear I/O circuit relays and back-up relays and to preset all timers. After the completion of the initialization, timer 6 is turned on or enabled in step 202 following which it is reset or started in step 203, after this, the common processing routine and the I/O refreshing routine are sequentially executed in steps 204 and 205, which are followed by the running of the user programs.

In the running of the user programs, first of all, in step 206 one instruction is fetched from a memory location of user program memory 4, the address of which is set in the program counter. In step 207, it is determined whether or not the fetched instruction is a particular instruction denoted as ENDW and described below. If the instruction is not ENDW but an ordinary controller instruction such as LD (load), AND (logical AND), OR (logical OR), OUT (output data), CNT (counter), TIM (timer), etc., the instruction is executed in step 208. In step 212, it is determined whether or not the instruction is an END instruction indicating that all the user programs are executed. If all the programs have not been executed, then steps 206, 207 and 208 are repeated.

On the other hand, if the ENDW instruction is found in step 206, a power flow register (PF) is checked in step 209 to determine whether or not it is set to 1. The conditions under which the power flow register is set to 1 are described below. If PF has been already set to 1, a flag F1 in working memory 3 of FIG. 1 is set to 1, and a cycle time is set into a register R1 in step 210. If the PF register has not already been set to 1 as determined in step 209, then the flag F1 is set to zero in step 211.

Figure 4:
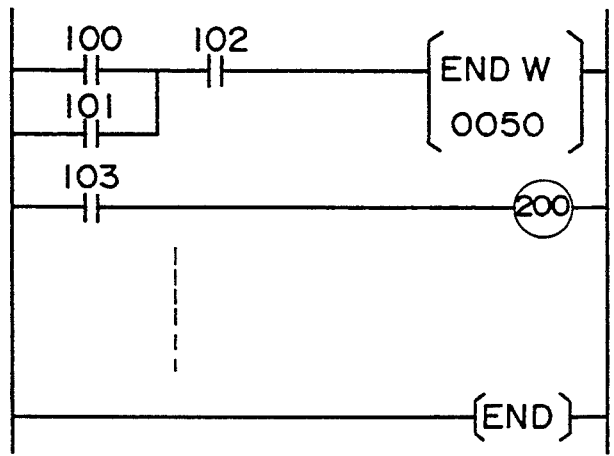
FIG. 4 is a ladder diagram representing an instruction for setting a cycle time.

In this embodiment, a cycle time setting instruction ENDW is provided as shown in FIG. 4. This cycle time setting instruction includes an operation code of ENDW and an operand of 0050 which represents the cycle time. This instruction sets a cycle time of 50 ms in this embodiment. In addition, I/O contacts of I/O relays are logically and selectively connected to control execution of the cycle time setting instruction. For example, the three I/O input contacts, 100, 101, and 102 are examined and their states stored in memory. Then the state of contacts 100 and 101 are ORed together. Then a logical multiplication of this result with the state of contact 102 is performed. If the result is true, the power flow register PF is then set to 1. This logical operation is depicted in the FIG. 4 ladder diagram. The actual operations are preformed by execution of user program instructions in step 208. If the ENDW instruction is detected in step 207 it can be effectively executed referring to a content of the PF register in step 209 which is a result of the logical operation among the states of the three input contacts 100, 101 and 102 as just described.

After the termination of step 210, steps 212, 206, 207 and 208 are repeatedly carried out until the end of the user programs. When the user programs are ended as determined in step 212, timer 6 is stopped in step 213.

During the above processing, the timer 6, shown in FIG. 1, which was started in step 203 counts the running time from the initiation of the common processing routine to the termination of the user programs.

After the END instruction, which specifies the end of the user programs, is found in step 212 and after timer 6 is stopped, the flag F1 is checked in step 214 to determine whether or not it is set to 1. If F1 has been set to 1, in step 216 the execution time counted by timer 6 is subtracted from the content of the register R1, that is, the cycle time set by the ENDW instruction (here 50 ms) and the result is assigned to a variable T1. Then, in step 217, T1 is checked to determine whether or not it is positive. If T1 is found positive, one half of T1 is then allocated to the host linking processing and the other half of T1 is allocated to the tool processing in step 218. Thereafter, the host linking processing routine and tool processing routine are executed in steps 219 and 220, respectively. As is shown in FIG. 3, if an execution time of 36 ms is required for the running of the common processing to the end of the user programs, the remaining time of 14 ms is equally divided into 7 ms, which is equally allocated to the host linking and to the tool processing routines, respectively. If the host linking is completed within a time less than 7 ms, MPU 1 waits until the time period of 7 ms elapses. This is also true for the tool processing. If the remaining time T1 is insufficient to conclude operation of the host linking and tool processing routines, the remainder of each routine is carried out during the next running of the program.

By contrast, if T1 is found negative in step 217, an execution time T is calculated with a conventional approach and allocated to the host linking processing and tool processing routines. In particular, the time T is calculated at 1.8 ms by multiplying the execution time between the start of the common processing to the end of all the user programs, that is, 36 ms in this embodiment, by a coefficient of 0.05. Then, the time of 1.8 ms is allocated to the host linking and to the tool processing, respectively. Thus, with the conventional approach, the time T increases or decreases in proportion to the execution time of the common processing to the end of the user programs.

If the result of the logical operation among the three input contacts 100, 101, and 102 shown in FIG. 4 goes to 0, the register PF is set to 0, which is determined in step 209 in the flow chart of FIG. 2. Accordingly, the flag F1 is reset to 0 in step 211. In this case, the conventional approach is applied to the execution time allocation as described above.

Since the cycle time can be constant at, for example, 50 ms in this embodiment as described above, an output device such as a motor or solenoid 200 (FIG. 4) connected to the PC can be precisely turned on and off at the constant cycle time. Accordingly, an object can be precisely controlled.

Figure 5:
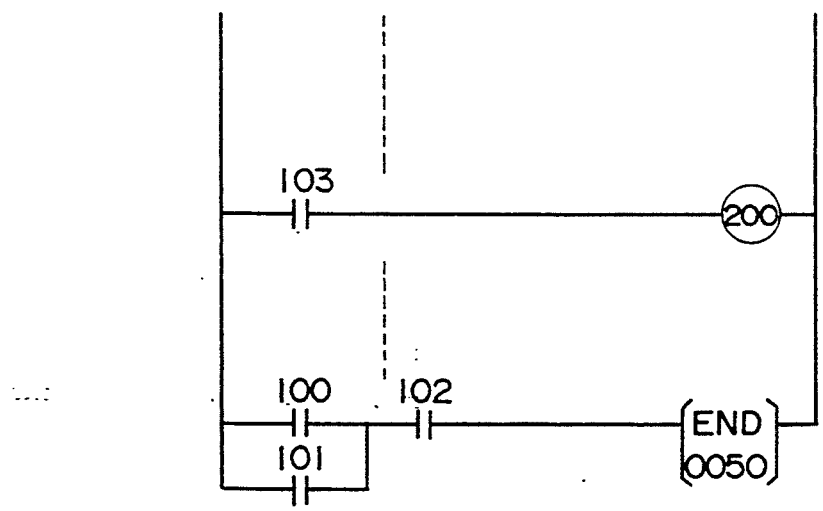
FIG. 5 is a ladder diagram representing a different instruction for setting a cycle time.
Figure 6A:
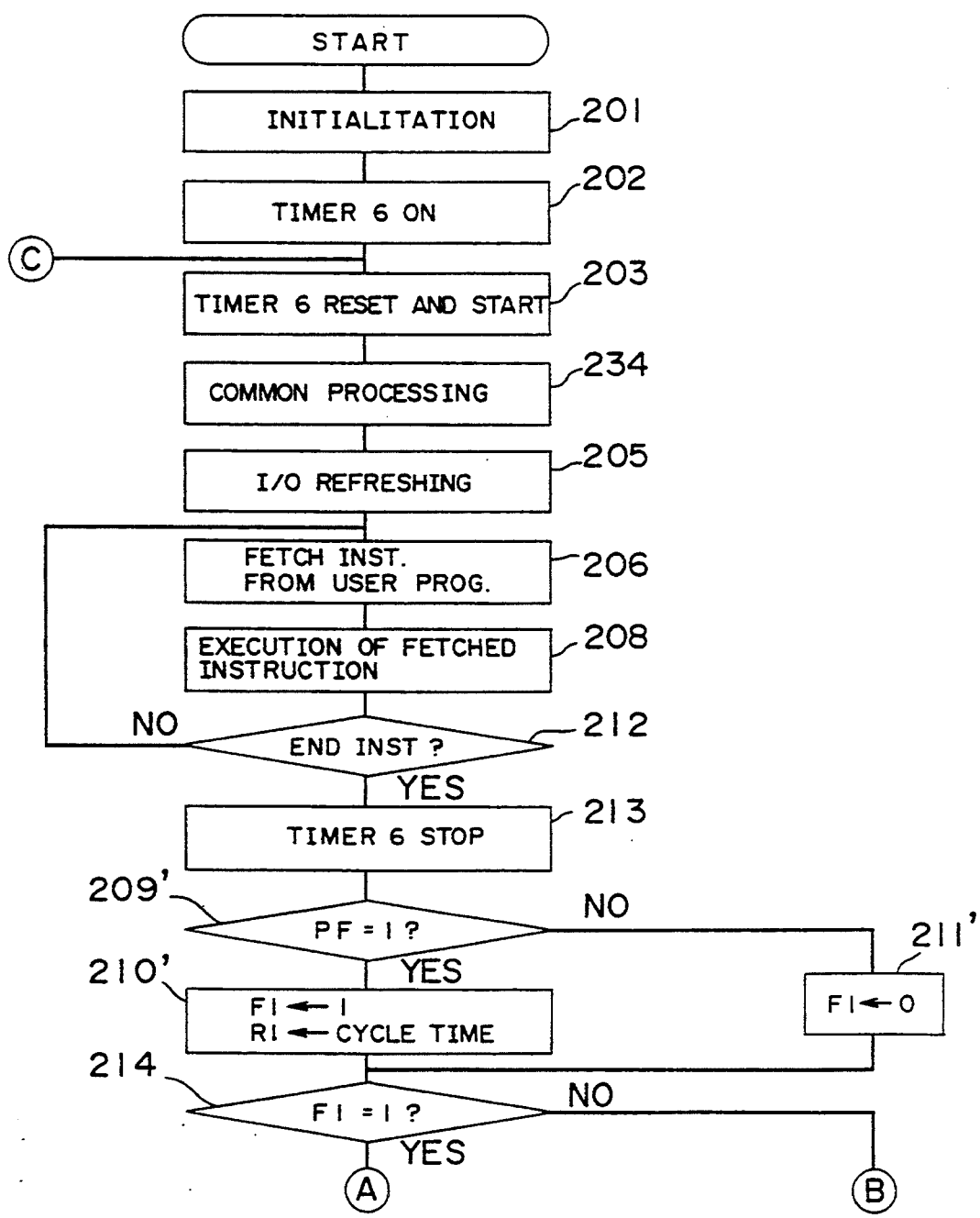
FIGS. 6(A), 6(B) together form a flow chart representing a modification of the FIG. 2 operation for use with the FIG. 5 instruction.
Figure 6B:
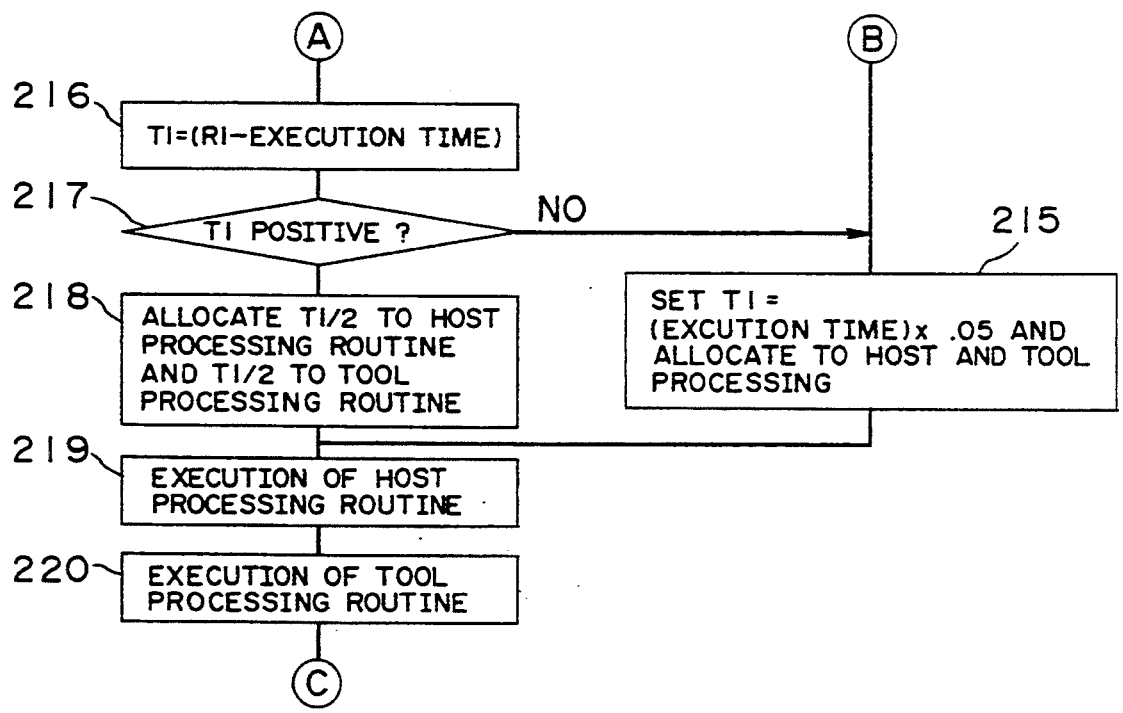

The ENDW instruction is used to set the cycle time in this embodiment. However, there are at least two other approaches to set a constant cycle time. On is to combine the PF flag with the END instruction for the end of the user programs as illustrated in the FIG. 5 ladder diagram. The END instruction also includes a cycle time setting operand. If the PF flag is combined with the END instruction, the constant cycle time can be ensured without using the ENDW instruction. The flow chart of FIG. 6 depicts operation of the PC in this circumstance. As shown therein, steps 207, 209, 210 and 211 of FIG. 2 are omitted, while additional steps 209′, 210' and 211' corresponding to omitted steps 209, 210 and 211 are added between steps 213 and 214. The END instruction always indicates the end of the user programs, even if a predetermined logical arrangement of input contacts 100, 101 and 102 does not exist.

Figure 7:
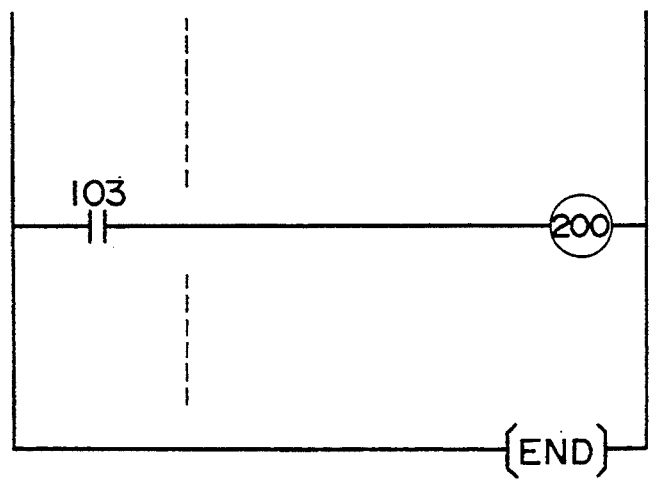
FIG. 7 is a ladder diagram representing another instruction.
Figure 8A:
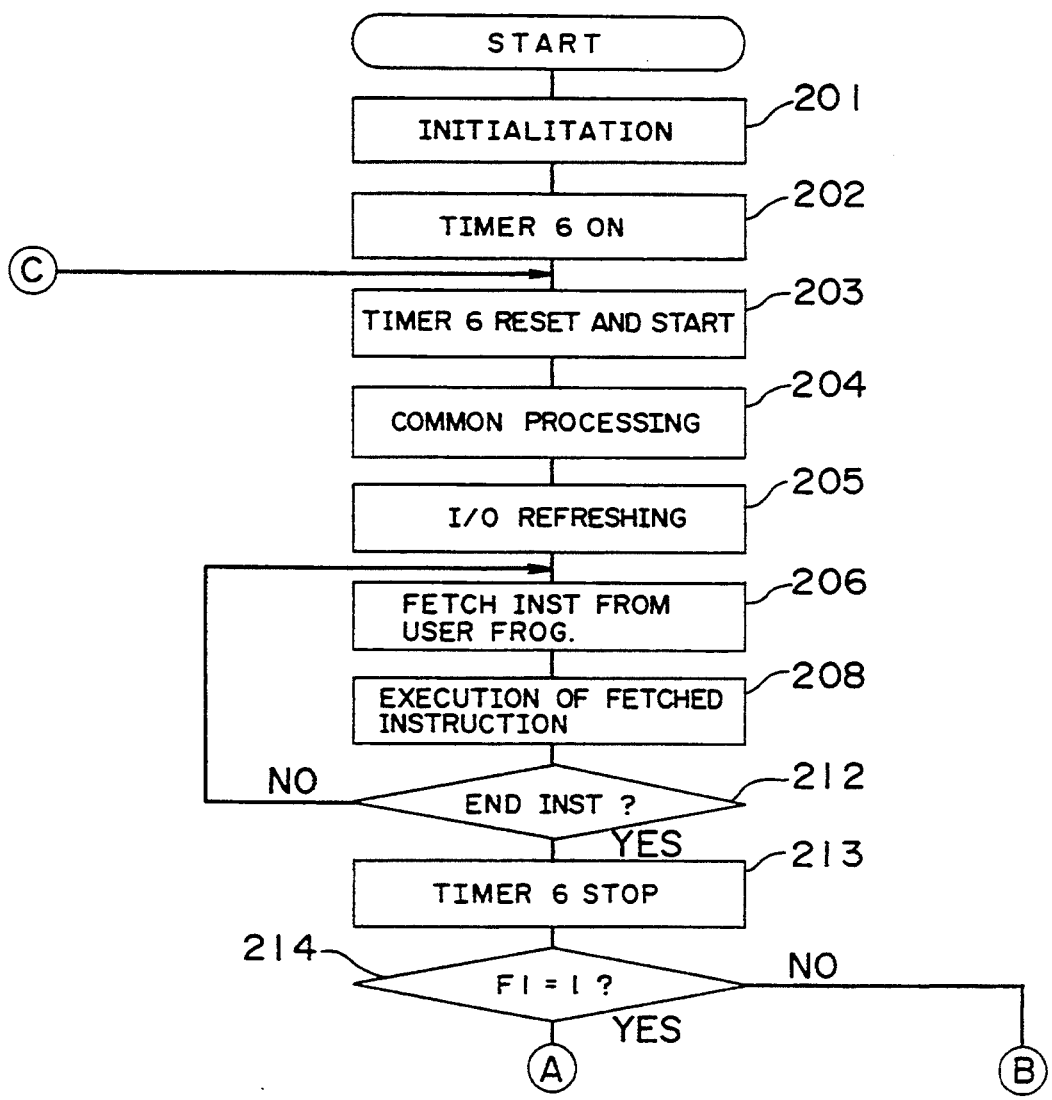
FIGS. 8(A), 8(B) together form a flow chart representing a modification of the FIG. 2 operation for use with the FIG. 7 instruction.
Figure 8B:
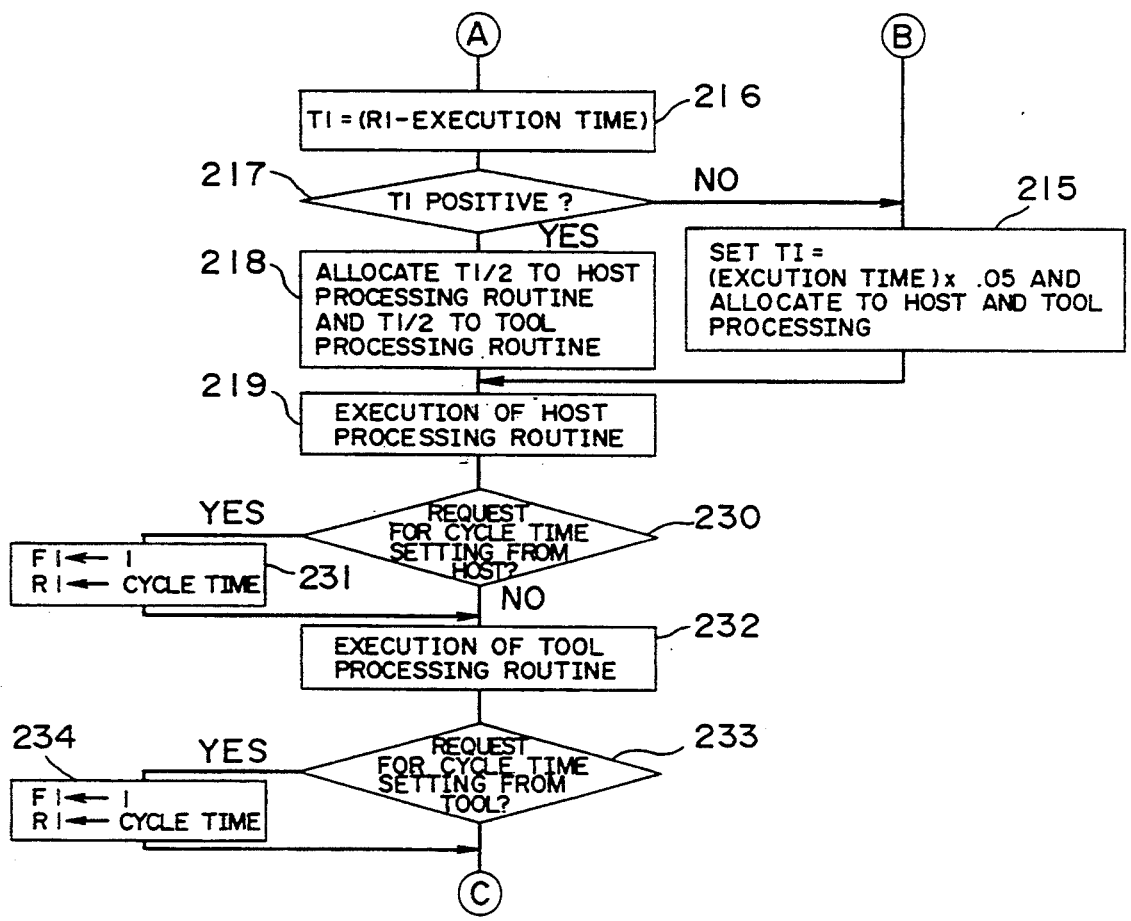

In the other approach, depicted in the ladder diagram of FIG. 7 and the corresponding FIG. 8 flow chart, the flags F1 and R1 are set through either an input from a host computer or by an input from tool control circuit 8 and a keyboard of a programming console, not shown. In this case, the constant cycle time can be also ensured without using the ENDW instruction. In addition, the first and second processings can be predetermined by either a host computer or by tool control circuit 8 and a programming console, not shown.

FIG. 8 differs from FIG. 2 in that steps 207, 209, 210 and 211 are omitted. Thus, each user instruction which is fetched in step 206 is directly executed in step 208. A determination is made in step 212 if an END instruction is present, as in the FIG. 2 flow chart, and when it is detected, the timer 6 is stopped in step in step 213. Following this steps 214, 215, 216, 217, 218, 219 and 220 are executed as in the FIG. 2 flow chart. In the FIG. 8 flow chart additional steps are executed after step 220, to allow the setting of the cycle time, before the processing returns to step 203. Thus, in step 230 a determination is made concerning whether there is a request to set a cycle time from a host computer. If the answer is NO, a tool processing routine is executed in step 232. If the answer is YES, the flag F1 is set to 1 and a cycle time received from the host computer is set in R1 and then step 232 is executed. After this, a determination is made in step 233 whether a tool has requested to set the cycle time. If not, the process returns to step 203. If YES, the flag F1 is set to 1 and the tool set cycle time is set in register F1 and then the processing returns to step 203.

The above description and the accompanying drawings are merely illustrative of the application of the principles of the present invention and are not limiting. Numerous other arrangements which fall within the spirit and scope of the invention may be readily devised by those skilled in the art. Accordingly, the invention is not limited by the foregoing description, but is only limited by the scope of the appended claims.

I claim:

1. A programmable controller, comprising:
means for setting a cycle time of a cycle for one round of execution of a series of processing routines, said series of processing routines comprising a first predetermined processing routine having a start and termination and a second predetermined processing routine having a start and a termination, said series of processing routines including a block of user programs whose execution is uninterruptedly completed within one cycle, wherein said setting means includes:
means for setting an instruction which specifies said cycle time;
input/output relay means logically linked to said instruction setting means to control the setting of said instruction;
first storage means for storing said cycle time specified by said instruction; and
second storage means for storing a logic state of said input/output relay means;
means for counting an execution time between the start of the first predetermined processing routine and the termination of the second predetermined processing routine which follows the first predetermined processing routine in said series of processing routines;
means for calculating a time difference between said execution time counted by said counting means and said cycle time; and
means for allocating said time difference to execution of the remainder of said series of processing routines subsequent to said second predetermined processing routine, when said execution time is less than said cycle time;
wherein said setting means further comprises, determining means for determining in response to said state stored by said second storage means whether or not said calculating means calculates said time difference between said execution time counted by said counting means and said cycle time.

2. The controller as in claim 1, wherein said instruction is an ENDW instruction which includes an operand specifying said cycle time, said controller further comprising means responsive to the logic state of said input/output relay means for causing said cycle time to be stored in said first storage means.

3. The controller as in claim 1, wherein said first storage means and second storage means are registers.

4. The controller as in claim 1, wherein said determining means checks a stored flag to determine whether said calculating means calculates said time difference.

5. The controller as in claim 4, wherein said first storage means and said flag are set by the execution of instructions of a program by said controller.

6. The controller as in claim 1, wherein said setting means further includes a programing console for setting said determining means and first storage means.

7. A programmable controller, comprising:
means for setting a cycle time of a cycle for one round of execution of a series of processing routines, said series of processing routines including a block of user programs whose execution is uninterruptedly completed within one cycle, wherein said setting means includes:
END instruction means for specifying said cycle time;
first storage means for storing said cycle time specified by said END instruction; and
input/output relay means logically linked to said END instruction means to control the setting of said END instruction;
second storage means for storing a logic state of said input/output relay means;
means for counting an execution time between a start of a first predetermined processing routine and a termination of a second predetermined processing routine which follows the first predetermined processing routine in said series of processing routines;
means for calculating a time difference between said execution time counted by said counting means and said cycle time; and
means for allocating said time difference to execution of the remainder of said series of processing routines subsequent to said second predetermined processing routine, when said execution time is less than said cycle time;
wherein said setting means further comprises determining means for determining in response to said logic state stored by said second storage means whether or not said calculating means calculates said time difference between said execution time counted by said counting means and said cycle time.

8. The controller as in claim 7, wherein said first storage means and second storage means are registers.

9. The controller as in claim 7, wherein said setting means further includes a programing console for setting said determining and said first storage means.

10. The controller as in claim 7, wherein said determining means checks a stored flag to determine whether said calculating means calculates said time difference.

11. The controller as in claim 10, wherein said first storage means and said flag are set by the execution of instructions of a program by said controller.

12. A programmable controller, comprising:
means for setting a cycle time of a cycle for one round of execution of a series of processing routines, said series of processing routines including a block of user programs whose execution is uninterruptedly completed within one cycle, wherein said means for setting includes:
means for determining the presence of a request for setting a cycle time;
first storage means responsive to the presence of a request for setting a cycle time for storing a cycle time; and
second storage means for storing an indication that a cycle time has been stored;
means for counting an execution time between a start of a first predetermined processing routine and a termination of a second predetermined processing routine which follows the first predetermined processing routine in said series of processing routines;
means for calculating a time difference between said execution time counted by said counting means and said cycle time; and
means for allocating said time difference to execution of the remainder of said series of processing routines subsequent to said second predetermined processing routine, when said execution time is less than said cycle time;
wherein said setting means further comprises determining means for determining in response to said state stored by said second storage means whether or not said calculating means calculates said time difference between said execution time counted by said counting means and said cycle time.

13. The controller as in claim 12 wherein said request and cycle time are provided by a host computer.

14. The controller as in claim 12 wherein said request and cycle time are provided by a tool including a programming console.

* * * * *